C. J. COLEMAN.
BRAKE FACING.
APPLICATION FILED NOV. 1, 1907.
993,031.
Patented May 23, 1911.
2 SHEETS—SHEET 1.
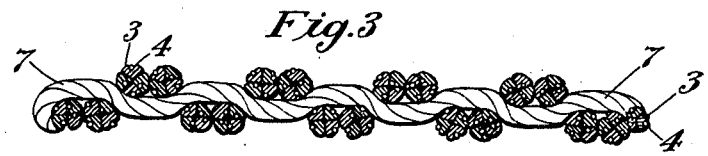
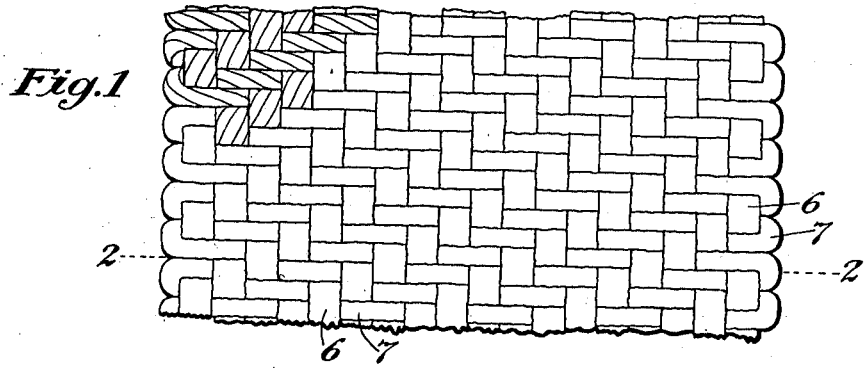
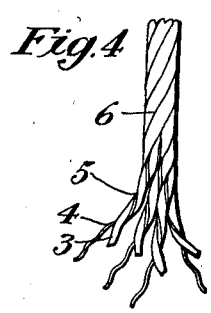
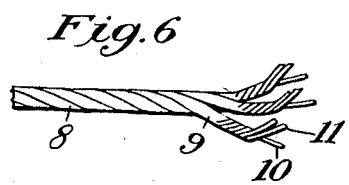
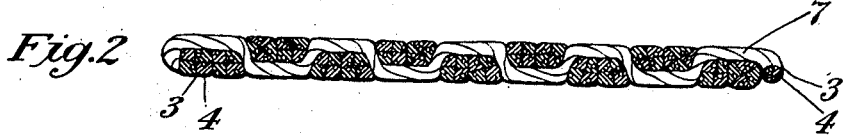
Witnesses:
Wm. Ashley Kelly
Margaret Best
Inventor:
Clyde J. Coleman
by Henry D. Williams
Attorney.

C. J. COLEMAN.
BRAKE FACING.
APPLICATION FILED NOV. 1, 1907.

993,031.

Patented May 23, 1911.
2 SHEETS—SHEET 2.

Witnesses:
Wm. Ashley Kelly
Margaret Best

Inventor:
Clyde J. Coleman
by Henry D. Williams
Attorney.

UNITED STATES PATENT OFFICE.

CLYDE J. COLEMAN, OF NEW YORK, N. Y., ASSIGNOR TO CONRAD HUBERT, OF NEW YORK, N. Y.

BRAKE-FACING.

993,031. Specification of Letters Patent. Patented May 23, 1911.

Application filed November 1, 1907. Serial No. 400,208.

*To all whom it may concern:*

Be it known that I, CLYDE J. COLEMAN, a citizen of the United States, residing at the borough of Manhattan, city of New York, in the county of New York and State of New York, have invented a certain new and useful Improvement in Brake-Facings, of which the following is a specification, reference being had therein to the accompanying drawings, forming part thereof.

My invention relates generally to braking devices and relates particularly to the brakes of automobiles, and the objects of my invention are simplicity, durability and efficiency. Other objects and advantages will be apparent from the following description.

My invention includes asbestos fibers held in place by wires interlaced therewith to form a brake facing.

My invention also includes various details of construction.

My invention will now be described with reference to the accompanying drawings, after which I will point out my invention in claims.

Figure 7:
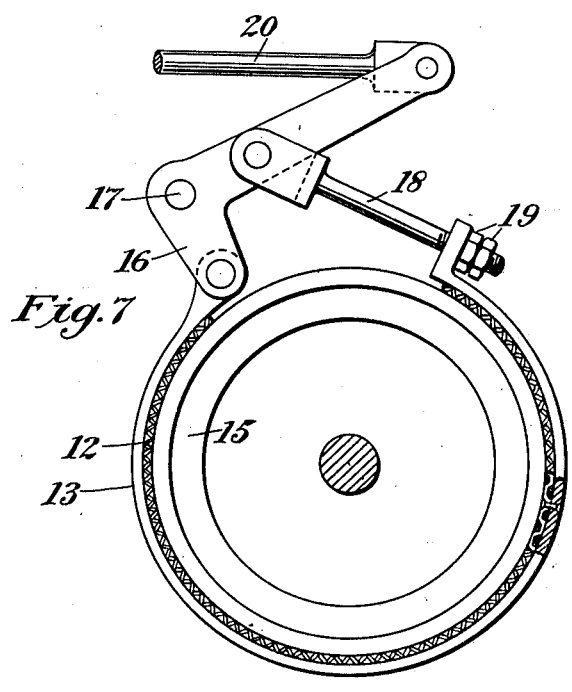
Figure 8:
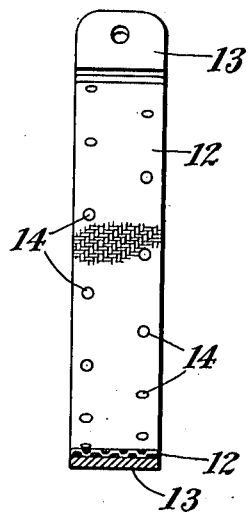
Figure 9:
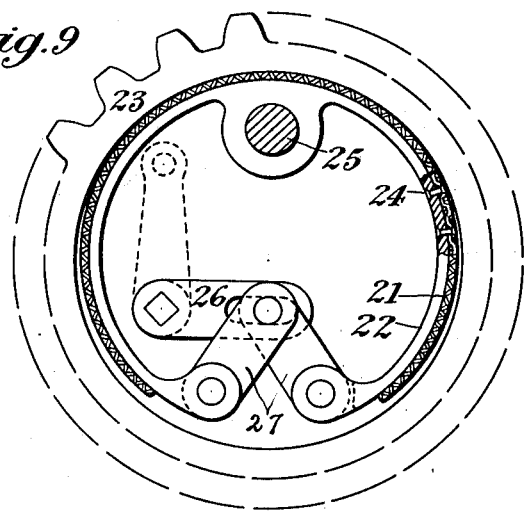
Figure 10:
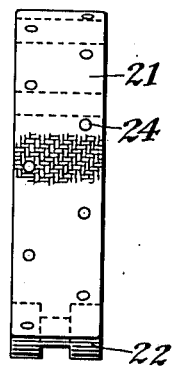

Figure 1 is a plan view of a portion of brake facing, broken away at the ends. Fig. 2 is a transverse section on the line 2—2 of Fig. 1. Fig. 3 is a view similar to Fig. 2 before the strip of fabric is compressed or felted. Fig. 4 is a detail of one of the warp cords. Fig. 5 is a detail of one of the weft or filling cords. Fig. 6 is a detail of a modified construction. Fig. 7 is an elevation showing my invention as embodied in a band brake. Fig. 8 is a sectional elevation of the brake band or brake strap shown in Fig. 7 as viewed from the left. Fig. 9 is an elevation showing my invention as embodied in an internal brake. Fig. 10 is an elevation of the brake band or brake shoe shown in Fig. 9 as viewed from the side.

In the illustrated embodiments of my invention a brake facing is shown comprising a strip of double selvaged fabric formed from interwoven or interlaced cords. Each cord is made up of a plurality of strands twisted together, and each strand is composed of asbestos fibers and a wire. In the preferred construction each strand is composed of a yarn or string 3 of asbestos fibers and a wire 4, the asbestos yarn and the wire being intertwisted or twisted together to form a strand 5, as indicated in Figs. 4 and 5. In Fig. 4 four strands 5 are intertwisted or twisted together to form a warp cord or longitudinal cord 6, and in Fig. 5 three strands 5 are similarly combined or intertwisted to form a weft or filling cord 7. The warp cords 6 and weft cords 7 are woven together to form a fabric, as indicated in Figs. 1, 2 and 3. This fabric is preferably in the form of a strip having selvage edges and of a width corresponding to the width of the brake shoe or brake strap.

The weave shown in the drawings is that known as "basket weave," but the particular nature of the weave is immaterial, and it is likewise immaterial as to the number of strands forming a cord of the warp or weft. It is only necessary that the fabric should be firm and compact. To render the brake fabric more compact and to give it a smooth surface subject to even friction and wear the fabric should be rolled or otherwise compressed or felted. The appearance of the freshly woven fabric before felting or compacting is indicated at Fig. 3, while the smooth compacted or felted brake-facing material or fabric is shown at Fig. 2.

In the modified construction shown in Fig. 6 the cord 8 from which the brake fabric or brake facing is woven is composed of intertwisted strands 9 of a slightly different nature or construction. Each strand 9 is composed of a wire core 10 and a number (shown as two) of asbestos fiber yarns or strings 11 wound about or around and covering the core 10. It is largely immaterial whether this modified construction or that first described be employed. The first is simpler and more convenient of manufacture.

A strip or band of fabric such as has been described is shown as employed as a facing 12 for a brake band 13 of a band brake (Figs. 7 and 8). The facing 12 is secured to the supporting band or brake strap 13 by rivets 14 located at regularly spaced intervals and in sufficient number to furnish firm support for the facing strip. The mechanism of the band brake illustrated in Fig. 7 is of well known construction and therefore will be only briefly described. The brake band 13 together with the flexible facing 12 is contracted to grip a friction pulley or friction disk 15 by a bell crank lever 16, pivoted to one end of the band 13 and having a fulcrum pivot pin 17. The lever 16 is connected to the other end of the band 13 by a link 18 provided with adjusting nuts 19. The lever may be actuated to apply or release the brake by an operating rod 20.

In Figs. 9 and 10 a brake facing 21 of the above described construction is shown as applied to a brake shoe 22 of an internal brake, adapted to act on the inside of the rim of a gear 23, and the facing is secured to the shoe by rivets 24. The brake actuating mechanism is well known and need be only briefly described. The brake shoe 22 is to some extent flexible and is supported on a pivot 25. The shoe 22 may be expanded or contracted, to apply or release the brake, by a bell crank lever 26, connected to the ends of the shoe 22 by links 27.

Brakes of the form shown and above described are commonly employed on automobiles. The conditions of service on automobile brakes are very severe, and the brake facing of my invention is intended especially to satisfactorily meet severe conditions of service and hard usage. It is strongly adhesive to the coacting surface and oil will not destroy its gripping qualities. It is durable under heavy rubbing friction, and is heat-resisting and cannot be destroyed by friction heat resulting from application of the brake. It is flexible, and therefore may be applied or secured to a brake shoe or brake band of any curvature or conformation. It is inextensible, and therefore will always present a smooth even braking surface. The interwoven wires impart strength and inextensibility and also firmly grip and retain or hold captive the intertwisted or interlaced asbestos fibers, and the asbestos fibers provide a durable, heat-resisting gripping or braking surface. As shown in the drawings, especially in Figs. 1 and 5, the interlaced wires are embedded, or sunken, in the asbestos fibers and, being so concealed, do not contact with the brake surface.

It is obvious that various modifications may be made in the constructions shown and above particularly described within the principle and scope of my invention.

I claim:—

1. A brake facing comprising asbestos fibers and wires interlaced therewith.

2. A brake facing comprising asbestos fibers and continuous wires interlaced therewith.

3. A brake facing comprising interlaced threads, each thread comprising a wire and a yarn of asbestos fibers twisted together.

4. A brake facing comprising interlaced strands, each strand comprising asbestos fibers and wire.

5. A brake facing comprising interlaced strands, each strand comprising asbestos fibers and a continuous wire.

6. A brake facing consisting of a fabric comprising interlaced cords, each cord comprising strands and each strand comprising asbestos fibers and a continuous wire.

7. A brake facing consisting of a fabric comprising interlaced cords, each cord comprising strands and each strand comprising asbestos fibers and a continuous wire intertwisted with the asbestos fibers.

8. A brake facing consisting of a fabric comprising cords woven together, each cord comprising strands and each strand comprising asbestos fibers and a continuous wire.

9. A brake facing consisting of a fabric comprising cords woven together, each cord comprising intertwisted strands and each strand comprising asbestos fibers and a continuous wire intertwisted with the asbestos fibers.

10. A brake facing consisting of a felted fabric comprising interlaced cords, each cord comprising strands and each strand comprising asbestos fibers and a continuous wire.

11. A brake facing consisting of a felted fabric comprising interlaced cords, each cord comprising strands and each strand comprising asbestos fibers and a continuous wire.

12. A brake facing consisting of a double-selvaged fabric comprising interlaced asbestos fibers and wires.

13. A brake facing comprising asbestos fibers and wires interlaced therewith and concealed in the asbestos fibers.

14. A brake facing consisting of a fabric comprising interlaced cords, each cord comprising strands and each strand comprising asbestos fibers and a continuous wire intertwisted with the asbestos fibers and concealed in the asbestos fibers.

15. A brake facing consisting of a double-selvaged fabric comprising interlaced asbestos fibers and wires, the wires being concealed in the asbestos fibers.

16. A band brake lining formed of compressible woven asbestos fiber.

17. A brake band formed of compressible woven asbestos textile fabric.

18. As an article of manufacture, a brake lining comprising an asbestos fabric and a metallic reinforce.

19. As an article of manufacture, a brake lining comprising an asbestos fabric and metallic strands incorporated therewith.

20. As an article of manufacture, a brake lining comprising superposed layers of fabric formed of fibers of asbestos and reinforcing metallic strands.

21. In a friction device for machine brakes, the combination with a friction sheet comprising an asbestos fabric and a metallic reinforce, of holding means for said sheet.

22. In a friction device for machine brakes, the combination with a friction sheet comprising an asbestos fabric and a metallic reinforce, of backing and holding means supporting said sheet.

In testimony whereof I affix my signature in presence of two witnesses.

CLYDE J. COLEMAN.

Witnesses:
WM. ASHLEY KELLY,
BERNARD COWEN.